Figures 1, 2:
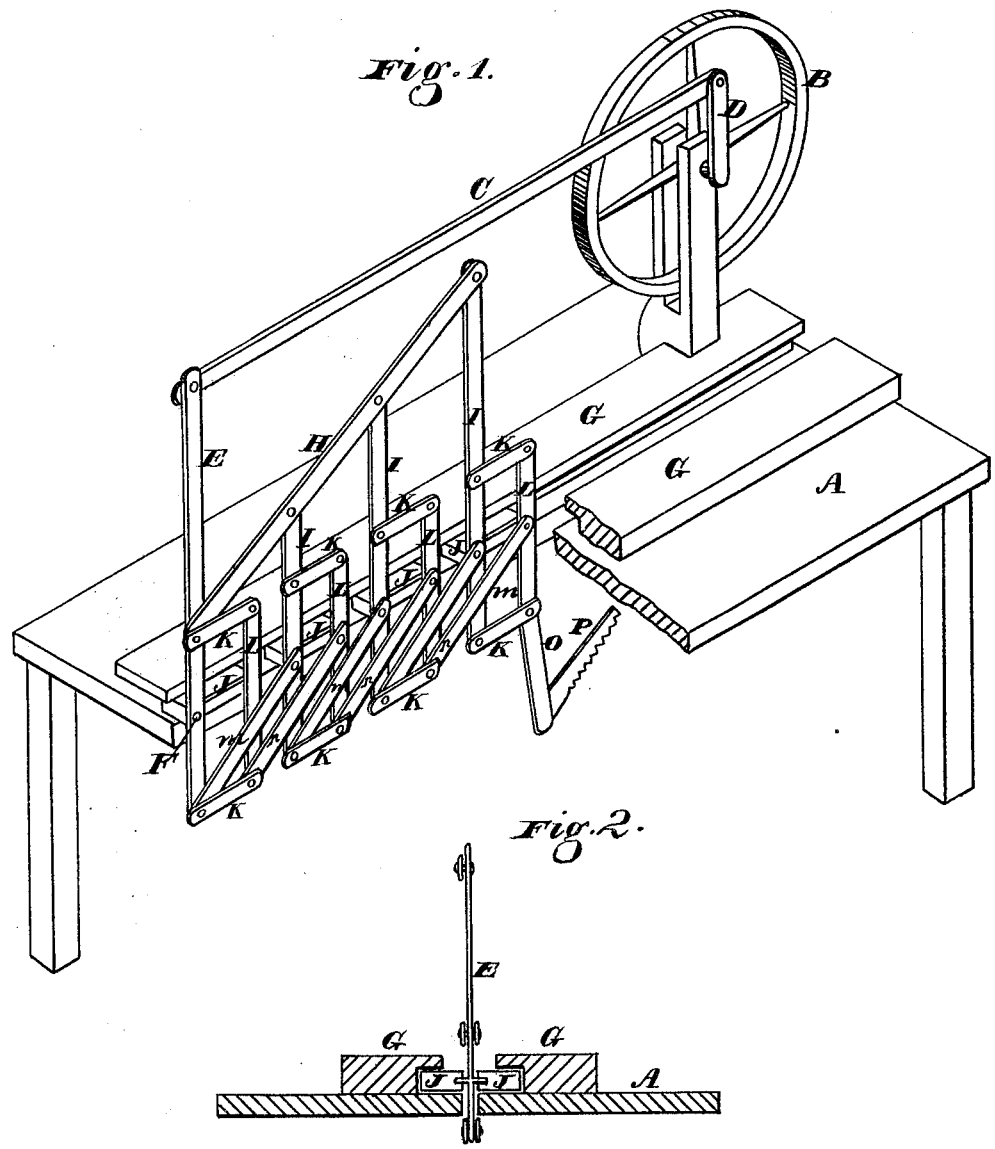

H. J. GASTMANN.
MECHANICAL POWERS.

No. 183,842. Patented Oct. 31, 1876.

Witnesses
Geo. H. Strong
Jno. L. Boone

Inventor
Henry J. Gastmann
by Dewey & Co.
Attys

UNITED STATES PATENT OFFICE.

HENRY JOHN GASTMANN, OF EUREKA, CALIFORNIA.

IMPROVEMENT IN MECHANICAL POWERS.

Specification forming part of Letters Patent No. 183,842, dated October 31, 1876; application filed June 13, 1876.

*To all whom it may concern:*

Be it known that I, HENRY J. GASTMANN, of Eureka, Humboldt county, State of California, have invented an Improved Mechanical Power; and I do hereby declare the following description and accompanying drawings are sufficient to enable any person skilled in the art or science to which it most nearly appertains, to make and use my said invention, without further invention or experiment.

My invention relates to a novel improvement in mechanical powers, which I call the "diamond lever-power;" and it consists in the combination of levers which form a series of parallel lever movements having a gradually-increasing stroke. This mechanism is connected with one main lever, and is operated by a pitman from a crank upon a driving-wheel.

Referring to the accompanying drawings for a more complete explanation of my invention, Figure 1 is a perspective view of my machine, with one side of the table broken away. Fig. 2 is a transverse section.

A is a table, having the driving-wheel B mounted upon it. A pitman, C, extends from the crank D of this wheel to the upper end of a long lever, E. The fulcrum of this lever is fixed at a point, F, between two guides, G, upon the table, and the short arm of the lever extends a little below the table, as shown. A bar, H, is pinned to this lever a short distance above its fulcrum, and extends upward at an angle from it, as shown, so that the three or more levers, I I, which have their upper ends pinned to the bar, are each successively longer than the preceding one. These levers stand parallel with the lever E, and each one has its fulcrum in a sliding block, J, which moves in the guides G. The short arms of these levers extend below the table like the lever E. The lever E, and each of the levers I, have short horizontal arms $k$ extending forward from the lower end and from a point equally above the fulcrum, and the ends of these arms are united by arms L, so that the whole forms a jointed parallelogram, the arms K forming two sides, while the other sides are formed by the arms I and L. The lower end of the lever E is connected with the fulcrum of the first lever I by means of a link, $m$, and the lower end of this lever I is connected with the fulcrum of the second lever I in a similar manner, and so on to the last. A second series of links, $n$, serve to connect the bottom of the first arm L with the center of the next in a similar manner.

The operation will then be as follows: Motion is communicated to the long arm of the lever E from the crank D, and this lever is caused to vibrate about its fixed fulcrum F. The connecting-links $m$ and $n$, which unite the lower ends of the levers E I I with the fulcrums of the next in advance, and also in a similar manner unite the arms L, act to move the slides J, which move in the guides G, forward and back, and each slide has an increased motion as its distance from the stationary lever E becomes greater. A bar, O, serves to connect the end of the last lever or arm with a saw, $p$, or any other device which it may be desired to drive by the use of my invention.

Having thus described my invention, what I claim as new, and desire to secure by Letters Patent, is—

A mechanical power consisting of the lever E, with its stationary fulcrum F, and the bar H connecting it with the levers I I, which have their fulcra in the slides J, in combination with the arms K and L, and the uniting-links $m$ and $n$, the whole constructed to operate substantially as herein described.

In witness whereof I have hereunto set my hand and seal.

HENRY JOHN GASTMANN. [L. S.]

Witnesses:
GEO. H. STRONG,
CHAS. G. PAGE.